United States Patent [19]

Kovacs

[11] Patent Number: 5,308,396
[45] Date of Patent: May 3, 1994

[54] METHOD OF MAKING LIGHTWEIGHT GRANULES COATED WITH CEMENTITIOUS MATERIAL

[75] Inventor: Laszlo Kovacs, West Molesey, England

[73] Assignee: Mazedawn Limited, Kent, England

[21] Appl. No.: 911,241

[22] Filed: Jun. 22, 1992

Related U.S. Application Data

[63] Continuation of Ser. No. 572,935, Sep. 10, 1990, abandoned.

[30] Foreign Application Priority Data

Mar. 10, 1988 [GB] United Kingdom ................ 8805694

[51] Int. Cl.⁵ ............................................ C04B 16/08
[52] U.S. Cl. ................................... 106/677; 427/214; 427/222; 521/55
[58] Field of Search .................. 427/214, 222; 521/55; 428/404, 407; 52/309.4, 309.12, 576, 577; 404/17, 30; 106/677

[56] References Cited

U.S. PATENT DOCUMENTS

| | | | |
|---|---|---|---|
| 3,104,196 | 9/1963 | Shannon | 428/407 |
| 3,711,431 | 1/1973 | Vargiu et al. | 521/55 |
| 3,764,357 | 10/1973 | Bowles et al. | 264/122 |
| 3,869,295 | 3/1975 | Bowles et al. | 521/55 |
| 4,011,355 | 3/1977 | Mandish et al. | 427/222 |
| 4,211,738 | 7/1980 | Genis | 264/44 |
| 4,238,242 | 12/1980 | Park | 428/404 |
| 4,245,054 | 1/1981 | Hohwiller | 427/222 |
| 4,398,958 | 8/1983 | Hodson et al. | 521/146 |

FOREIGN PATENT DOCUMENTS

| | | | |
|---|---|---|---|
| 525096 | 5/1956 | Canada | 427/214 |
| 1815053 | 12/1968 | Fed. Rep. of Germany | 106/677 |
| 2063206 | 7/1971 | Fed. Rep. of Germany | 521/55 |
| 2234909 | 1/1974 | Fed. Rep. of Germany . | |
| 2351469 | 4/1975 | Fed. Rep. of Germany | 106/677 |
| 3000047 | 7/1981 | Fed. Rep. of Germany . | |
| 1584810 | 1/1970 | France . | |
| 46-38717 | 11/1971 | Japan | 427/222 |
| 47-28683 | 7/1972 | Japan | 106/677 |
| 7000480 | 7/1970 | Netherlands | 427/222 |
| 297612 | 5/1971 | U.S.S.R. | 106/677 |
| 823392 | 4/1981 | U.S.S.R. | 427/222 |

*Primary Examiner*—Terry J. Owens
*Attorney, Agent, or Firm*—Bacon & Thomas

[57] ABSTRACT

In producing an additive for a building material, lightweight granules (e.g., polystyrene beads) are first coated with a waterproof adhesive by mixing in a suitable mixer. When the granules are satisfactorily coated, they are further coated with a wet cementitious material, for example aggregate and wet cement, or with wet plaster, which is added to the mixture. Only sufficient moisture is added to allow the cement or plaster to initiate the chemical reaction which results in the curing of the coating material on the granules. The wet material acts to separate the granules while forming a coating thereon. The granules are then removed from the mixture and allowed to dry and set. The dry granules may then be added to a conventional concrete or plaster mix.

10 Claims, No Drawings

METHOD OF MAKING LIGHTWEIGHT GRANULES COATED WITH CEMENTITIOUS MATERIAL

This application is a continuation of application Ser. No. 07/572,935, filed Sep. 10, 1990, now abandoned.

This invention relates to an additive to a building material, particularly, but not exclusively, a concrete or plaster building material.

Over the years many attempts have been made to alter the characteristics or properties of concrete and plaster. For example it is known to increase the strength of concrete by including steel reinforcing elements. In particular however it is known to include in the concrete granules of a lightweight material such as polyurethane, perlite or expanded polystyrene.

The introduction of granules, for example of polystyrene, into concrete or plaster presents difficulties however in obtaining adequate binding between the concrete and the granules. It is a problem of known building materials of this type that the granules are easily broken away from the concrete or plaster, with the result that the material tends to disintegrate at the edges as the granules break away.

It is known from FR 2324589A to form a building additive by coating beads of lightweight polystyrene with adhesive and then adding a dry material such as cement to the mixture. In this arrangement, the dry material appears to mix with the adhesive, the excess dry material is shaken off the beads and the beads are said not to agglomerate.

It is an object of the present invention to provide an improved additive and building material by a new process.

From a first aspect, the invention provides a method of making a cementitious building material with an additive therein, said additive comprising discrete granules of a lightweight material each coated with an adhesive to which is adhered a cured cementitious coating material, the additive being introduced into the building material, wherein said granules of a lightweight material are first mixed with said adhesive in a mixer to form a coating thereon, and then coated with said cementitious coating material which is then cured, characterised in that said cementitious coating material is added wet to said mixer and mixed with the granules until the granules become coated and separated, at which point the granules are removed from the mixer and allowed to dry to produce granules with a cured cementitious coating.

From a second aspect the invention provides a method for producing an additive for the method above, said additive comprising discrete granules of a lightweight material each coated with an adhesive to which is adhered a cured cementitious coating material, wherein said granules of a lightweight material are first mixed with said adhesive in a mixer to form a coating thereon, and then coated with said cementitious coating material which is then cured, characterised in that said cementitious coating material is added wet to said mixer and mixed with the granules until the granules become coated and separated, at which point the granules are removed from the mixer and allowed to dry to produce granules with a cured cementitious coating.

It has been found that such a process provides coated granules which have improved properties and which will adhere better to the material to which they are to be added. The provision of a cured surface on the granules according to the present invention allows better binding with a material and may allow a thicker and more robust coating to be provided on the bead, allowing for a greater variation in the properties of the additive than has hitherto been possible. This is in contrast to the beads produced according to FR 2324589 which merely have a coating of dry powder on their surface.

It has been known to produce a concrete material containing lightweight granules by a method wherein polystyrene beads are mixed with a bonding agent diluted with water. After the beads are fully coated with the agent, dry cement or cement mix is added to coat the beads. Immediately after coating, more cement and water are added to give the final mixture, and the mass mixed until it is homogeneous. The whole mixture is then allowed to set.

This is in contrast to the method of the present invention where a cured coating is formed on the granules before they are added to the final building material.

By providing the granules with a cured cementitious coating, better binding of the granules in the building material is achieved. Furthermore the coating gives the granules added weight which enables a good distribution of the granules in the building material to be achieved.

The resultant building material is lighter than conventional materials, is fire resistant, and has good thermal and acoustic insulation properties.

Of course, the coated granules could be manufactured in advance and then transported to a desired site for addition to the building material.

The cementitious building material to which the coated granules are added may be for example a cement/aggregate mixture or plaster. It has been found that the present invention gives particularly good results when applied to plaster.

The cementitious coating material added to the adhesive coated granules is wetted, prior to addition, by an amount sufficient to allow it to go off after coating. The cementitious material, will not form a coating of dry uncured powder on the granules, but, rather, a cured coating.

It is particularly preferred that the cementitious coating material is a mixture of aggregate and wet cement. Preferably the aggregate will be sharp sand, although it will be appreciated that there are other possibilities. This will provide a very stable hard coating when cured, which will allow for excellent binding in the final building material. Other wet cementitious coating materials such as wet plaster, however, can of course be used.

It should be noted that the material of the cementitious coating need not be the same as the building material to which the granules are eventually added. For example granules coated with a cement/sand aggregate can be added to a plaster mix.

The lightweight granules may be formed of any suitable material, but a preferred such material is an expanded plastics material, for example expanded polystyrene.

The adhesive used can be any conventional type, but should not be of a type that would react deleteriously with the material used for the granules. The adhesive is preferably waterproof whereby, when the additive is incorporated in the final building material, moisture will be prevented from entering the granules of lightweight material, thereby avoiding dampness. Where the granules are formed of expanded polystyrene, a proprietary EVA (ethylene vinyl acetate) adhesive such as "UNIBOND" (trade mark) again preferably waterproof, may be used.

The size of the granules, which may be approximately spherical before being coated, may be varied depending on the application of the building material, however a typical size would be in the range from 1.5 mm to 4 mm in diameter. Sizes outside this particular range can of course also be successfully used.

The proportion of granules in the resulting building material may also be varied depending on the characteristics of the building material desired. It will be appreciated that a greater percentage of granules will produce a greater variation in the properties of the building material from the conventional material.

In a preferred embodiment, the granules are coated with the adhesive by mixing therewith in, for example, a conventional concrete mixer. The amount of adhesive used is chosen to give an even coating of a desired thickness on the granules, and it may if desired, be diluted with water or some suitable solvent. When the granules are well coated with the adhesive, they are coated with an aggregate and wet cement mixture or with wet plaster, again by mixing therewith. The amount of moisture added to the cement or plaster prior to addition to the adhesive coated granules is just sufficient to allow the cement or plaster to go off. The aggregate and cement or plaster may be mixed with the adhesive coated granules in any convenient manner, but in a particularly simple method, they are merely added to the mixer already containing the granules. The aggregate and cement may have been premixed in another mixer. During mixing with the adhesive coated granules the aggregate and cement or the plaster act to separate the granules, which up to this point have been agglomerated together under the action of the adhesive.

When the granules have become coated with the cement or plaster and separated, they can be removed from the mixer and allowed to dry and cure. This can be done in any convenient manner e.g. on a drying tray or on a conveyor and curing can be assisted if desired by an air blower.

Some embodiments of the present invention will now be described by way of example only.

To form a building material according to an embodiment of the present invention, granules of expanded polystyrene are first coated with an adhesive, e.g. UNIBOND (trade mark). This may be done simply by mixing the ingredients in a rotary cement type mixer although any suitable mixer would suffice. The adhesive coated granules are then rolled in wet cement and sand aggregate so as to coat the granules in cement. This may again be done in a cement type mixer. Conveniently the cement and sand are added to the same mixer holding the adhesive coated granules. The cement and sand act to separate and coat the granules which when sufficiently coated and separated, are removed from the mixer and allowed to dry so that the cement sets. This produces small stone-like granules that can be added to a conventional concrete mix of cement, sharp sand and water, to give excellent binding therewith.

They may also for example, be added to a conventional plaster mix, and this combination has been found to be particularly advantageous.

The resulting building material is lighter than conventional concrete or plaster and has good thermal and acoustic properties. In addition it is fire resistant up to at least 1200° C. Furthermore the material is susceptible to nailing, drilling and being screwed into without damage or cracking, in effect the material is shock-absorbent. The extent to which the material possesses these properties will depend on the percentage of granules in the material. The relative proportions of granules, sand and cement may be varied at will in a concrete mix to produce the desired combination of, say, strength and acoustic insulation. The greater the amount of granules, the lower the strength will be but the insulation will be improved. A typical mixture however may contain equal proportions of sand, cement and granules.

The granules may typically be about 4 mm in diameter in building blocks, however the size of the granules may be varied depending on the application intended for the building material. For example small, finer granules may be introduced into rendering and plaster, although granules as large as 4 mm in diameter have been successfully used in plaster.

Three sample coated granule compositions will now be described by way of example. The granules were in each case first coated by the adhesive and then by the cement/aggregate in a manner as generally described above. The adhesive in each case was waterproof EVA, in particular "UNIBOND" (trade mark). Also, just sufficient water was added to the aggregate/cement mix to allow the cement to go off after coating.

EXAMPLE 1

Extra light to medium weight coated granules -coated density 150 Kgm$^{-3}$; 4 mm diameter of 1.5 mm diameter polystyrene beads

| 50 Liters | Polystyrene beads |
| --- | --- |
| 0.75 Liters | Waterproof glue |
| 5 Liters | Sharp sand |
| 2 Liters | Cement |

EXAMPLE 2

Medium weight - coated density 250 Kgm$^{-3}$; 4 mm diameter polystyrene beads

| 35 Liters | Polystyrene beads |
| --- | --- |
| 1 Liter | Waterproof glue diluted with .5 Liters water |
| 5.25 Liters | Sharp sand |
| 3.5 Liters | Cement |

EXAMPLE 3

Heavy weight, coated density 300 Kgm$^{-3}$; 4 mm diameter polystyrene beads

| 5 Liters | Polystyrene beads |
| --- | --- |
| .2 Liters | Waterproof glue diluted with .1 liters water |
| 1.5 Liters | Sharp sand |
| .5 Liters | Cement |

After coating, the beads were emptied from the mixer into a rack or tray where they were dried and cured before adding to a plaster or concrete mix.

It will be appreciated that these are only examples of some of the many various possible additive compositions.

Although sharp sand and wet cement have been used in the examples, they could equally be replaced by for example wet plaster.

It should be noted that the term 'cementitious material' as used herein is intended to encompass all cementitious materials as might be used in the building art such as, for example, Portland cement, plaster, gypsum and the like.

Furthermore the term granules is intended to cover any particulate material, spherical or otherwise, such as beads.

It will be appreciated that the building material according to the invention has many possible applications depending on the particular balance of constituents. In addition to the use of the material in building blocks, plastering and rendering mentioned above, the building material may be used to make plaster boards, roofing, wall and ceiling boards, and even fire doors.

I claim:

1. A method of making a lightweight building additive comprising discrete granules of a lightweight material each coated with an adhesive to which is adhered a cured cementitious coating material, said method comprising the consecutive steps of:
    mixing said granules of a lightweight material with said adhesive in a mixer to form an adhesive coating thereon;
    adding a wet cementitious coating material to said mixer and mixing said cementitious coating material with the adhesive coated granules until the adhesive coated granules become coated with the cementitious coating material and separated;
    removing said granules from the mixer; and
    drying said granules to produce granules with a cured cementitious coating.

2. A method as claimed in claim 1, wherein the mixer is a rotary mixer.

3. A method as claimed in claim 1, wherein said wet cementitious material is a mixture of aggregate and cement.

4. A method as claimed in claim 1, wherein said adhesive is an EVA (ethylene vinyl acetate) adhesive.

5. A method as claimed in claim 1, wherein said adhesive is waterproof.

6. A method as claimed in claim 1, wherein said lightweight material is expanded plastics.

7. A method of making a cementitious building material with a lightweight additive comprising discrete granules of a lightweight material each coated with an adhesive to which is adhered a cured cementitious coating, said method comprising the consecutive steps of:
    mixing said granules of a lightweight material with said adhesive in a mixer to form an adhesive coating thereon;
    adding a wet cementitious coating material to said mixer and mixing said cementitious coating material with the adhesive coated granules until the adhesive coated granules become coated with the cementitious coating material and separated;
    removing said granules from the mixer;
    drying said granules to produce granules with a cured cementitious coating; and
    adding said granules to said cementitious building material.

8. A method of making a cementitious building material as claimed in claim 7, wherein said building material is concrete.

9. A method of making a cementitious building material as claimed in claim 7, wherein said building material is plaster.

10. A method of making a building additive comprising discrete granules of a lightweight material each coated with an adhesive to which is adhered a cured cementitious coating material, said method comprising the consecutive steps of:
    mixing granules of an expanded plastic material in a rotary mixer with an EVA (ethylene vinyl acetate) adhesive to form an adhesive coating thereon;
    adding a wet cementitious material to the adhesive coated granules in said rotary mixer;
    rotating said mixer so as to mix said wet cementitious material with said adhesive coated granules until said granules become coated with a cementitious coating and separated; and
    removing said coated granules from said mixer and drying said granules so as to produce granules with a cured cementitious coating.

* * * * *